(12) United States Patent
Liu et al.

(10) Patent No.: US 9,967,317 B2
(45) Date of Patent: May 8, 2018

(54) METHODS AND SYSTEMS FOR SENDING AND RECEIVING ALERTS

(71) Applicant: TENCENT TECHNOLOGY (SHENZHEN) COMPANY LIMITED, Shenzhen (CN)

(72) Inventors: Zhengyi Liu, Shenzhen (CN); He Zou, Shenzhen (CN); Yingjun Ma, Shenzhen (CN); Li Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 38 days.

(21) Appl. No.: 14/444,122

(22) Filed: Jul. 28, 2014

(65) Prior Publication Data
US 2016/0028661 A1    Jan. 28, 2016

Related U.S. Application Data (63) Continuation of application No. PCT/CN2014/077178, filed on May 9, 2014.

(30) Foreign Application Priority Data

Jul. 25, 2013 (CN) .......................... 2013 2 0317802

(51) Int. Cl.
| | | |
|---|---|---|
| H04L 12/58 | (2006.01) | |
| H04L 29/08 | (2006.01) | |
| H04L 29/06 | (2006.01) | |

(52) U.S. Cl.
CPC ............ *H04L 67/10* (2013.01); *H04L 51/046* (2013.01); *H04L 51/24* (2013.01); *H04L 69/18* (2013.01)

(58) Field of Classification Search
CPC .................................................... H04L 51/04
(Continued)

(56) References Cited

U.S. PATENT DOCUMENTS 8,301,741 B2   10/2012  Kulasingam et al.
8,904,239 B2 * 12/2014  Seren ................ G06F 11/3664
                                                    714/46

(Continued)

FOREIGN PATENT DOCUMENTS

CN        101212423 A      7/2008
CN        102088634 A      6/2011
(Continued)

OTHER PUBLICATIONS

Wikipedia, XML, printed Aug. 22, 2017, pp. 1-14.*
(Continued)

*Primary Examiner* — Backhean Tiv
(74) *Attorney, Agent, or Firm* — Anova Law Group, PLLC (57) ABSTRACT

A method for sending and receiving alerts in an instant messaging environment are disclosed. The method includes receiving a request for alerts from a service provider, the request including an alert template and a rule to retrieve the alert template. The method also includes receiving a trigger from the service provider, the trigger including an identification of an alert receiver, the rule to retrieve the alert template, and changeable contents for the alert template. The method further includes obtaining the alert template from the request for alerts based on the rule to retrieve the alert template in the trigger; composing an alert using the alert template and the changeable contents; and sending the alert to the alert receiver identified in the trigger. The method and system consistent with the present disclosure may enrich the user experience in instant messaging applications.

20 Claims, 6 Drawing Sheets

(58) Field of Classification Search
USPC .................................................. 709/203–206
See application file for complete search history.

(56) References Cited

U.S. PATENT DOCUMENTS

| | | | | |
|---|---|---|---|---|
| 9,135,292 B1* | 9/2015 | Tsun | ................. | G06F 17/30424 |
| 9,615,228 B1* | 4/2017 | Kilpatrick | ............... | H04W 4/14 |
| 2002/0133381 A1* | 9/2002 | Tso | ........................ | G06Q 10/02 |
| | | | | 705/5 |
| 2004/0186889 A1* | 9/2004 | Washburn | .......... | G06Q 30/0218 |
| | | | | 709/206 |
| 2005/0027676 A1* | 2/2005 | Eichstaedt | .............. | G06F 9/542 |
| 2005/0133590 A1* | 6/2005 | Rettenmyer | ........... | G06K 19/08 |
| | | | | 235/380 |
| 2005/0144266 A1* | 6/2005 | Antonelli | ................ | H04L 29/06 |
| | | | | 709/223 |
| 2005/0273372 A1* | 12/2005 | Bowne | ................... | G06Q 10/02 |
| | | | | 705/5 |
| 2006/0031184 A1* | 2/2006 | Periyaswamy | ..... | G06F 17/3056 |
| 2006/0095774 A1* | 5/2006 | Butterfield | ............ | G06F 9/4448 |
| | | | | 713/176 |
| 2007/0162315 A1* | 7/2007 | Hodges | ................. | G06Q 10/02 |
| | | | | 705/7.12 |
| 2007/0239494 A1* | 10/2007 | Stephens | ................ | G06Q 10/02 |
| | | | | 705/5 |
| 2009/0055427 A1 | 2/2009 | Kulasingam et al. | | |
| 2009/0150193 A1* | 6/2009 | Hong | ..................... | G06Q 10/02 |
| | | | | 705/5 |
| 2009/0167553 A1* | 7/2009 | Hong | ..................... | G06Q 10/02 |
| | | | | 340/4.61 |
| 2009/0222348 A1* | 9/2009 | Ransom | ................. | G06Q 30/02 |
| | | | | 705/14.73 |
| 2009/0248456 A1* | 10/2009 | Fahmy | ................... | G06Q 10/02 |
| | | | | 705/5 |
| 2010/0113072 A1* | 5/2010 | Gibson | ................ | G06Q 20/045 |
| | | | | 455/466 |
| 2010/0153487 A1* | 6/2010 | Greven | ............ | G06Q 10/06311 |
| | | | | 709/203 |
| 2012/0296680 A1* | 11/2012 | Jantz | ...................... | G06Q 10/02 |
| | | | | 705/5 |
| 2013/0103508 A1* | 4/2013 | Liubachev | ......... | G06Q 30/0242 |
| | | | | 705/14.73 |
| 2013/0110943 A1* | 5/2013 | Menon | ................. | G06Q 10/107 |
| | | | | 709/206 |
| 2013/0173733 A1* | 7/2013 | Vrbaski | ................... | H04L 51/24 |
| | | | | 709/207 |
| 2013/0226634 A1* | 8/2013 | Jackson | ............ | G06Q 30/0236 |
| | | | | 705/5 |
| 2015/0019662 A1* | 1/2015 | O'Kane | ................ | G06Q 10/107 |
| | | | | 709/206 |
| 2015/0149220 A1* | 5/2015 | Omar | ..................... | G06Q 10/02 |
| | | | | 705/5 |
| 2016/0028661 A1* | 1/2016 | Liu | ........................ | H04L 51/24 |
| | | | | 709/206 |

FOREIGN PATENT DOCUMENTS

CN          103023745 A          4/2013
CN          103139048 A          6/2013

OTHER PUBLICATIONS

The World Intellectual Property Organization (WIPO) International Search Report for PCT/CN2014/077178 dated Jul. 23, 2014.
The State Intellectual Property Office of the People's Republic of China (SIPO) Office Action 1 for 201310317802.0 dated Jul. 14, 2017 pp. 1-7.

* cited by examiner

Figure 1

Alert Template

Parameters:

NickName# = WeChat nick name    #16char_body# <= 16 char/ 8 Chinese char    #32char_body# <= 32char

64char_body# <= 64char    #128char_body# <= 128char    #256char_body# <= 256char

Number# : Numbers only

Select template:  Alert to be triggered by WeChat user account ▼

Composition:
Help?

Dear #NickName#:
Thank you for your interest in the #16char_body# hotel. We have issued a membership card for the #16char_body# club. Members enjoy many benefits, such as #128char_body#. Please check out our webpage for more details: #128char_body#.

[#16char_body# Hotel IT Services

The body of alert is limited to 300 characters.
The parameters in the template need to be populated.

Parameters:

Preview alert:

Dear #NickName#:
Thank you for your interest in the #16char_body1# hotel. We have issued a membership card for the #16char_body2# club. Members enjoy many benefits, such as #128char_body1#. Please check out our webpage for more details: #128char_body2#.

[#16char_body3# Hotel IT Services

NickName# does not need to edited.
Other parameters are numbered. The alert will be populated with corresponding parameters.

Receive request from service provider for sending alerts, including template for alert and the rules for retrieving alert template — 401

Receive trigger for alert from service provider, including information for alert receiver, rule for retrieving alert, and changeable contents in alert — 402

Send alert to service receiver as reminder, alert being composed based on alert template and changeable contents received in trigger — 403

METHODS AND SYSTEMS FOR SENDING AND RECEIVING ALERTS

CROSS-REFERENCES TO RELATED APPLICATIONS

Related Applications

This application is based upon and claims the benefit of priority from Chinese Patent Application No. 201310317802.0, filed on Jul. 25, 2013, the entire content of which is incorporated herein by reference.

FIELD OF THE TECHNOLOGY

The present disclosure relates to Internet technologies and, more particularly, to methods and systems for sending and receiving alerts using instant messaging services.

BACKGROUND

With the development of information technologies, news alerts and other alerts are widely used in various environments. For example, a bank may have an alert service to remind users of its credit card payment due dates. The bank may send a credit card statement to a user's smartphone using the traditional Short Messaging Services to remind the user to pay the credit card by the due date.

Instant messaging is an Internet based service used to instantly exchange data or messages. An instant messaging service provider may offer the service to users through its software applications and interfaces. Instant messaging applications are widely used by Internet users and mobile device users. A user may perform various operations using instant messaging applications. For example, a user may use an instant messaging application to establish the relationship with a service provider, and then complete transactions with the service provider. Compared to using traditional communication means, using instant messaging services to perform business transactions is fast and straightforward. However, when a transaction is complete, a user needs a confirmation. To send the confirmation to the user through a Short Messaging Service, the service provider would need to have the user's telephone number. This requirement may cause loss of privacy and add complexity to the business relationships and operations. Further, if the user most often conducts transactions through the instant messaging service, receiving the confirmation through a Short Messaging Service may degrade the user experience.

The disclosed method and system are directed to solve one or more problems set forth above and other problems.

BRIEF SUMMARY OF THE DISCLOSURE

Embodiments consistent with the present disclosure provide a method, system, mobile device, or a server for sending and receiving alerts through an instant messaging interface. Embodiments consistent with the present disclosure enable instant messaging users to complete business transactions seamlessly.

One aspect of the present disclosure provides a method for sending and receiving alerts in an instant messaging environment. The method may include receiving a request for alerts from a service provider, the request including an alert template and a rule to retrieve the alert template and receiving a trigger from the service provider, the trigger including an identification of an alert receiver, the rule to retrieve the alert template, and changeable contents for the alert template. The method may further include obtaining the alert template from the request for alerts based on the rule to retrieve the alert template in the trigger, composing an alert using the alert template and the changeable contents, and sending the alert to the alert receiver identified in the trigger.

The method for sending and receiving alerts may further include verifying the request for alerts based on pre-set standards. In addition, the method may include establishing a testing account; receiving a trigger from the service provider, the trigger including an identification the test account, the rule to retrieve the alert template, and changeable contents for the alert template; and obtaining the alert template from the request for alerts based on the rule to retrieve the alert template in the trigger. The method may also include composing an alert using the alert template and the changeable contents and sending the alert to the test account identified in the trigger. The method for sending and receiving alerts may also include storing an operation log with data related to sending and receiving alerts requested by the service provider and sending the operation log to the service provider.

Another aspect of the present disclosure provides a method for sending and receiving alerts in an instant messaging environment. The method may include receiving, by a server for sending and receiving alerts, a request for alerts from a service provider, the request including an alert template and a rule to retrieve the alert template; and receiving, by the server for sending and receiving alerts, a trigger from the service provider, the trigger including an identification of an alert receiver, the rule to retrieve the alert template, and changeable contents for the alert template. The method may further include obtaining by the server for sending and receiving alerts, the alert template from the request for alerts based on the rule to retrieve the alert template in the trigger; composing, by the server for sending and receiving alerts, an alert using the alert template and the changeable contents; and sending, by the server for sending and receiving alerts, the alert to the alert receiver identified in the trigger.

The method for sending and receiving alerts may further include verifying, by the server for sending and receiving alerts, the request for alerts based on pre-set standards. In addition, the method may include establishing, by the server for sending and receiving alerts, a testing account; receiving, by the server for sending and receiving alerts, a trigger from the service provider, the trigger including an identification of the test account, the rule to retrieve the alert template, and changeable contents for the alert template; and obtaining, by the server for sending and receiving alerts, the alert template from the request for alerts based on the rule to retrieve the alert template in the trigger. The method may also include composing, by the server for sending and receiving alerts, an alert using the alert template and the changeable contents; and sending, by the server for sending and receiving alerts, the alert to the test account identified in the trigger. The method for sending and receiving alerts may also include storing, by the server for sending and receiving alerts, an operation log with data related to sending and receiving alerts requested by the service provider; and sending, by the server for sending and receiving alerts, the operation log to the service provider.

Another aspect of the present disclosure provides a system for sending and receiving alerts in an instant messaging environment. The system may include a first obtaining module configured to receive a request for alerts from a service provider, the request including an alert template and a rule to retrieve the alert template; and a first receiving module configured to receive a trigger from the service provider, the trigger including an identification of an alert receiver, the rule to retrieve the alert template, and changeable contents for the alert template. The system may further include a second obtaining module configured to obtain the alert template from the request for alerts based on the rule to retrieve the alert template in the trigger; a composing module configured to compose an alert using the alert template and the changeable contents; and a sending module configured to send the alert to the alert receiver identified in the trigger.

The system for sending and receiving alerts may further include a verifying module configured to verify the request for alerts based on pre-set standards. The system for sending and receiving alerts may also include a testing module configured to establish a testing account. The first receiving module may be further configured to receive a trigger from the service provider, the trigger including an identification of the test account, the rule to retrieve the alert template, and changeable contents for the alert template. The second obtaining module may be further configured to obtain the alert template from the request for alerts based on the rule to retrieve the alert template in the trigger. The composing module may be further configured to compose an alert using the alert template and the changeable contents. The sending module may be further configured to send the alert to the test account identified in the trigger.

The system for sending and receiving alerts may further include a storing module configured to store an operation log with data related to sending and receiving alerts requested by the service provider. The sending module may be further configured to send the operation log to the service provider.

In embodiments consistent with the present disclosure, the request for alerts may also include multiple alert templates and multiple rules for retrieving alert templates. Each alert template may correspond to one or more rules for retrieving alert templates. The step of obtaining the alert template may further include obtaining the alert template based on the one or more rules for retrieving alert templates received from the trigger.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

In the present disclosure, a service provider may be a provider for any type of services. For example, a service provider may be a travel agency, a hotel, a restaurant, etc. An alert receiver may be an individual or an organization that receives an alert generated by a service provider. The alert receiver may have received services from a service provider. For example, an alert receiver may be a hotel guest, a restaurant patron, etc.

Figure 8:
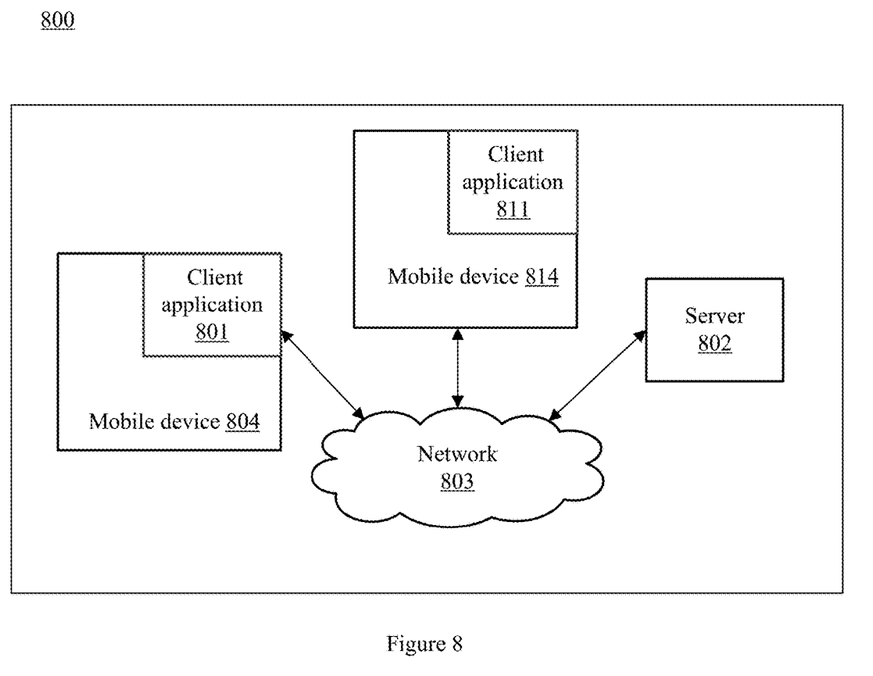
FIG. 8 illustrates an exemplary operating environment incorporating certain disclosed embodiments.

FIG. 8 illustrates an exemplary online computer environment 800 incorporating certain disclosed embodiments. As shown in FIG. 8, environment 800 may include mobile devices 804 and 814, a network 803, and a server 802. The network 803 may include any appropriate type of communication network for providing network connections to the mobile devices 804 and 814, and the server 802. For example, network 803 may include the Internet, LAN (Local Area Network), or other types of computer networks or telecommunication networks, either wired or wireless.

A server 802, as used herein, may refer to one or more server computers configured to provide certain functionalities, which may require any user accessing the services to authenticate to the server before the access. The server 802 may also include one or more processors to execute computer programs in parallel. The server 802 may include any appropriate server computers configured to provide certain server functionalities, such as storing or processing data related to sending and receiving alerts. Although only one server is shown, any number of servers can be included. The server 802 may operate in a cloud or non-cloud computing environment.

Mobile devices 804 and 814 may include any appropriate type of network computing devices, such as PCs, tablet computers, smartphones, network TVs, etc. Mobile devices 804 and 814 may include one or more client applications 801 and 811. The client applications 801 and 811, as used herein, may include any appropriate software application, hardware application, or a combination thereof to achieve certain client functionalities, such as running an instant messaging application/user interface. For example, client applications 801 and 811 may be the Tencent WeChat application, which may enable multi-media communications among a number of users. Any number of client applications 801 and 811 may be included in the environment 800.

Figure 9:
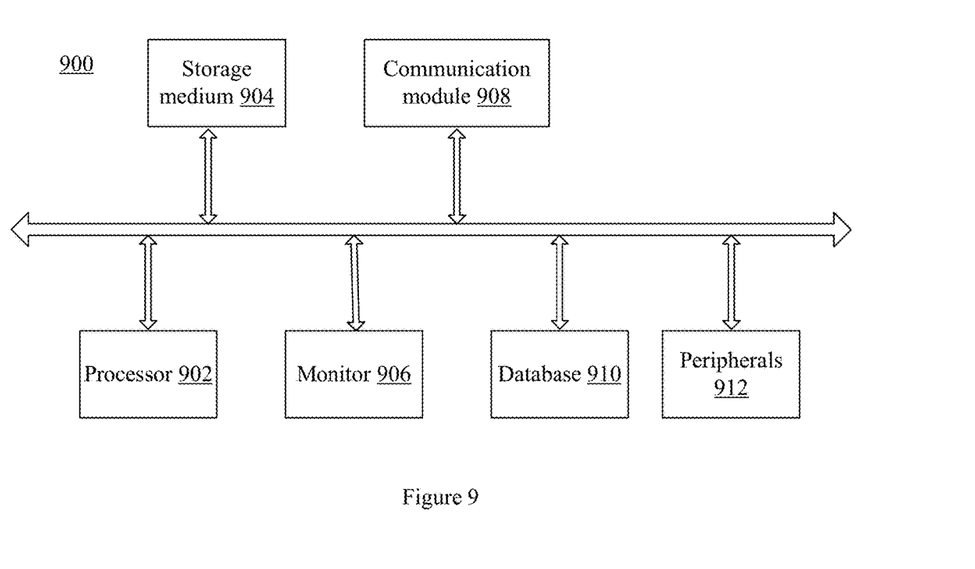
FIG. 9 illustrates a block diagram of an exemplary computer system consistent with the disclosed embodiments.

Mobile devices 804/814 and server 802 may be implemented on any appropriate computing platform. FIG. 9 illustrates a block diagram of an exemplary computer system 900 capable of implementing mobile devices 804/814 and server 802.

As shown in FIG. 8, computer system 900 may include a processor 902, storage medium 904, a monitor 906, a communication module 908, a database 910, and peripherals 912. Certain devices may be omitted and other devices may be included.

Processor 902 may include any appropriate processor or processors. Further, processor 902 can include multiple cores for multi-thread or parallel processing. Storage medium 904 may include memory modules, such as Read-only Memory (ROM), Random Access Memory (RAM), flash memory modules, and erasable and rewritable memory, and mass storages, such as CD-ROM, U-disk, and hard disk, etc. Storage medium 904 may store computer programs for implementing various processes, when executed by processor 902.

Further, peripherals 912 may include I/O devices such as a keyboard and a mouse. Communication module 908 may include network devices for establishing connections through the communication network 903. Database 910 may include one or more databases for storing certain data and for performing certain operations on the stored data, such as database searching.

In operation, the server 802 may obtain and process data related to sending and receiving alerts through user interfaces of mobile devices 804/814. For example, the server 802 may be a server for sending and receiving alerts. The server 802 may use processor 902 to compose an alert message. The server 802 may use processor 902 to send the alert to an alert receiver.

Figure 1:
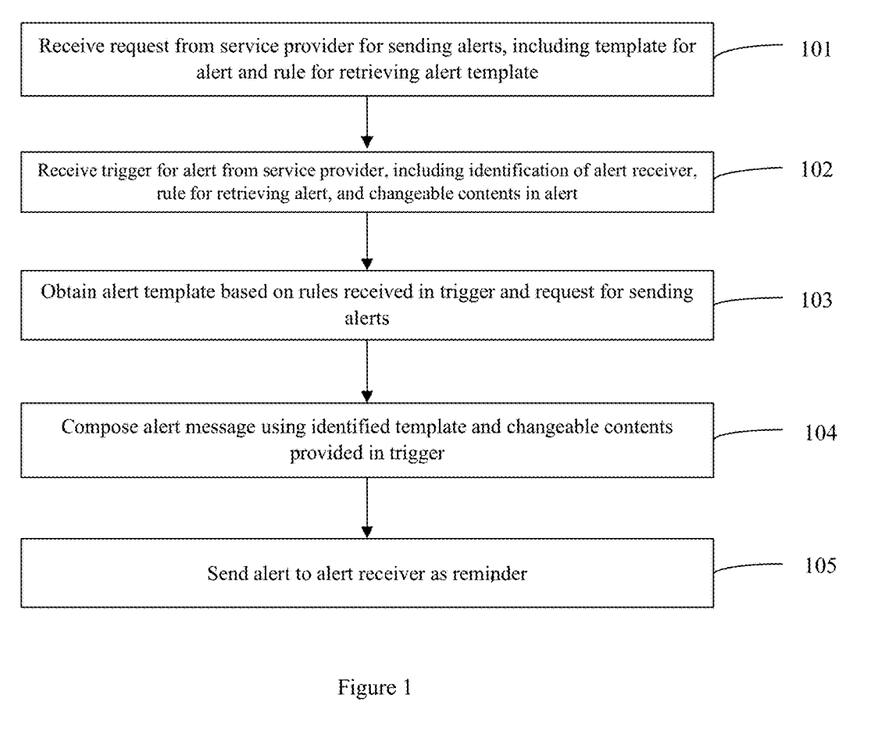
FIG. 1 is a flowchart of a method for sending and receiving alerts implemented by an exemplary embodiment consistent with the present disclosure.

FIG. 1 shows a flow chart of a method for sending and receiving alerts implemented by embodiments consistent with the present disclosure. The method shown in FIG. 1 includes steps 101-105. In step 101, a system for sending and receiving alerts may receive a request from a service provider for sending alerts. The service provider may include in the request one or more templates for alerts and the rules for retrieving a specific alert template. In one embodiment, before the system for sending and receiving alerts enable the functionalities to send alerts to users, it may receive requests from service providers. A request may include the templates for alerts and the rules for retrieving a specific alert template. That is, applying the provided rules, the system may identify/retrieve the corresponding template for an alert. An alert template may define the format of the alert, include certain pre-set contents, and include certain changeable contents. In one example, the rules for retrieving one or more templates may include "operation successful" or "operation failed."

Figure 2:
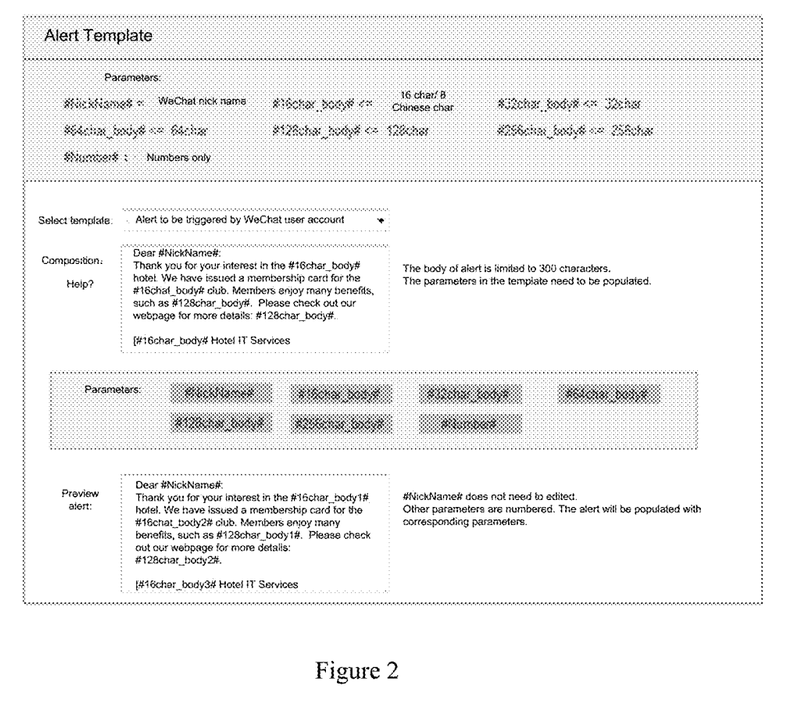
FIG. 2 is an exemplary instant messaging user interface implemented by an exemplary embodiment consistent with the present disclosure.
Figure 3:
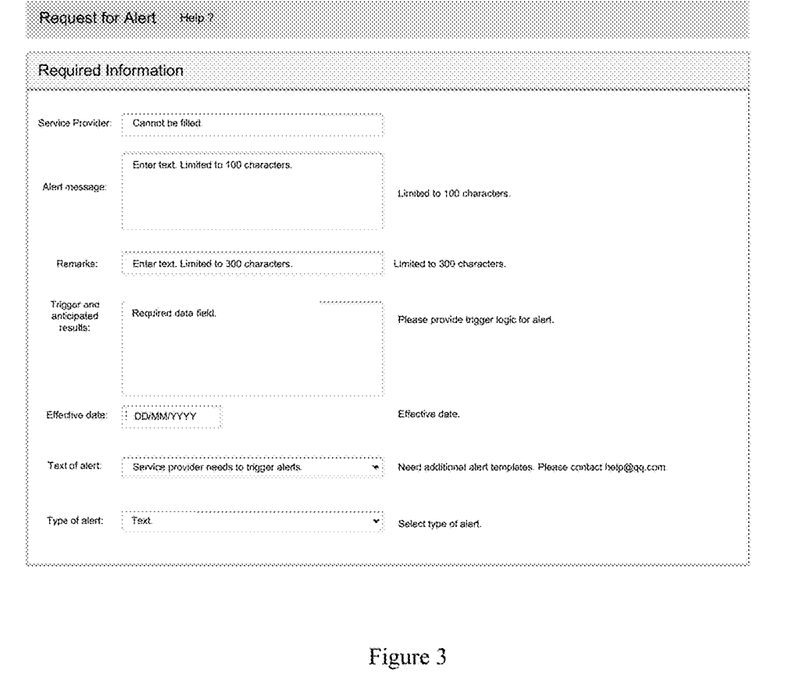
FIG. 3 is another exemplary instant messaging user interface implemented by an embodiment consistent with the present disclosure.

FIG. 2 provides an exemplary alert template. As shown in FIG. 2, the service provider may set the alert format and provide the parameters (#Nickname#, #16char_body#, #Number#, etc.) for the pre-set contents in the alert template. The alert may also be previewed. Further, the service provider may compose an alert based on an exemplary template supported by the instant messaging service host. As shown in FIG. 3, the service provider may compose the content of the alert such as the text of the alert. The service provider may also set the rules for triggering the alert.

In step 102, the system for sending and receiving alerts may receive a trigger for an alert from the service provider. A trigger may include the identification of the alert receiver, the rule for retrieving an alert, and the changeable contents in the alert. In certain embodiments, the relationship between the service provider and the user may change. For example, a user may be promoted to a higher level of membership. Based on the rules set by the service provider, the relationship or status change may also trigger different contents to be generated for the alerts sent to the user.

In step 103, the system for sending and receiving alerts may obtain an alert template based on the rules set by the service provider. In certain embodiments, when the system receives a trigger for an alert, it may first check the rule for retrieving the corresponding alert template. Thereafter, the system may identify the alert template corresponding to the rule. In step 104, the system for sending and receiving alerts may compose the alert message using the identified template and the changeable contents provided by the service provider. In some embodiments, when the system receives a trigger for the alert from the service provider, the system may obtain the changeable contents included in the trigger. The system may then compose the alert message using the changeable contents. In some embodiment, the alert template may specify the positions for the changeable contents. The system for sending and receiving alerts may fill in the changeable contents at the specified positions and compose the alert message. For example, an alert template may have a data field "XXX reservation is confirmed." The service provider may specify that the changeable content for the "XXX" data field is "The Star Hotel." The system for sending and receiving alerts may then populate the data field with the changeable content. The alert may then be "The Star Hotel reservation is confirmed." In step 105, the system for sending and receiving alerts may send the alert to the alert receiver (i.e., the alert receiver or user) as a reminder. In some embodiments, the system may obtain the alert receiver (i.e., the alert receiver or user) information from the trigger and then send the composed alert to the alert receiver (i.e., the alert receiver or user).

A service provider may send a request for alerts with rules that are not compatible with the alert templates. For example, a service provider may mistakenly link a rule such as "Order Complete" to an alert template with the message of "XXX order failed." The system for sending and receiving alerts cannot properly alert an alert receiver using such an alert template. To avoid this type of problems, the system may verify the request from a service provider before accepting the request. Based on verification rules, the system for sending and receiving alerts may verify each alert request submitted by a service provider. If the request is verified, then the system may further process the alert request. Verification rules may be pre-set by the service provider or the instant messaging service provider.

In some embodiments, to ensure that the alert templates provided by the service providers can properly alert the alert receivers (users), the system for sending and receiving alerts may test the alert request submitted by a service provider before it accepts any trigger sent by the service provider. If the alert request passes the test, the system may then accept the trigger from the service provider. Many different tests can be set up to test the requests. The following is an exemplary test that can be implemented by an embodiment consistent with the present disclosure.

First, the system for sending and receiving alerts may set up a list of test accounts. The list may include one or more test accounts. A test account may be a user account of the instant messaging service. A test account may be an account for a tester. Further, the system may receive a trigger from a service provider. The trigger may include a rule for the requested alert, changeable contents for the alert, and an identification of a test account. The system may then obtain the alert template corresponding to the rule for the requested alert from a request for alerts submitted by the service provider. The system for sending and receiving alerts may then compose the alert using the alert template and the changeable contents received from the service provider. Finally, the system may send the composed alert to the test account identified in the trigger.

The above-described testing process simulates the instant messaging alert process. Instead of sending an alert to a user, the alert is sent to a test account. Based on the user experience of the test account, the system for sending and receiving alerts may then determine whether a request for alerts submitted by a service provider is valid. If the test process produced a proper alert to the test account, then the system may determine that the request for alert is valid and can be used to send alerts to users. If the test process produced an incorrect alert to the test account, the system may further adjust/debug the request for alerts until it generates a correct alert.

In some embodiments, the service provider may obtain data related to alerts sent to the alert receivers (i.e., the alert receiver or user). The service provider may analyze the data to improve the effectiveness of its alerts and determined whether to send more alerts the alert receiver (i.e., the alert receiver or user). The system for sending and receiving alerts may execute the following steps to provide data to service providers. The system may store a log for operations related to sending and receiving alerts. The system may provide the log to the service provider for further analysis.

Embodiments consistent with the present disclosure first receive a request for alerts from a service provider. Then the system may also receive a trigger to send the alert from the service provider. The system may obtain the identification of the alert receiver (i.e., the alert receiver or user), a rule for retrieving the alert template, and changeable contents for the alert template. The alert template is received as a part of the request for alerts. The system may then identify the alert template corresponding to the rule in the trigger. The system may further compose the alert based on the alert template and the changeable contents provided by the service provider. The system may then send the alert to the alert receiver (i.e., the alert receiver or user) as a reminder. Embodiments consistent with the present disclosure do not send alerts through Short Messaging Services. The system may send alerts to the alert receiver (i.e., the alert receiver or user) through instant messaging services and improve the user experience of the alert receiver (i.e., the alert receiver or user). In addition, the service provider does not need to obtain the alert receiver's (i.e., the alert receiver or user) telephone numbers when implementing a system for sending and receiving alerts consistent with the present disclosure. Embodiments consistent with the present disclosure thus may improve the efficiency of the alert process.

Figure 4:
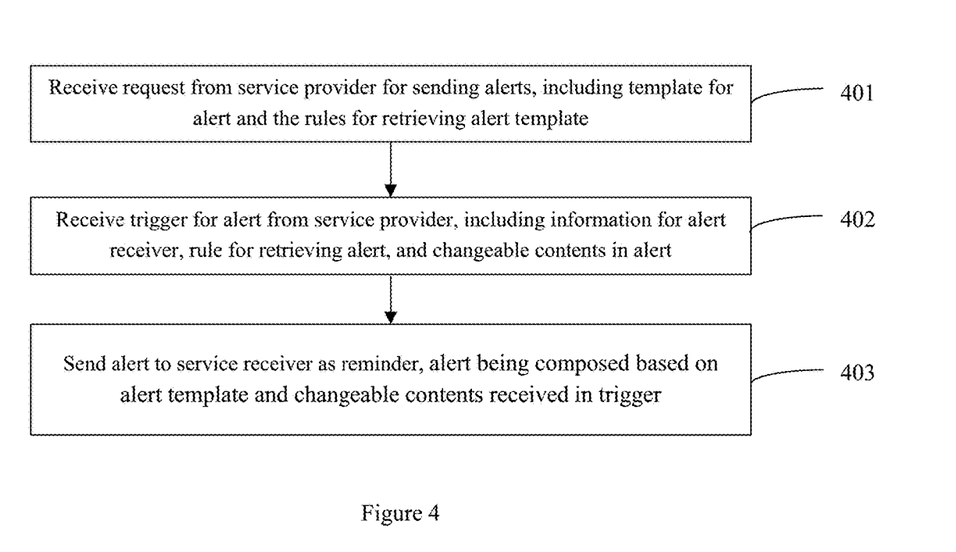
FIG. 4 is another flowchart of a method for sending and receiving alerts implemented by an exemplary embodiment consistent with the present disclosure.

FIG. 4 shows another flow chart for sending and receiving alerts implemented by embodiments consistent with the present disclosure. The method disclosed in FIG. 4 includes steps 410-403. In step 401, a server for sending and receiving alerts may receive a request from a service provider for sending alerts. The service provider may include in the request the templates for alerts and the rules for retrieving specific alert templates. In some embodiments, before the server for sending and receiving alerts enable the functionalities to send alerts to users, it may receive requests from service providers. A request may include the templates for alerts and the rules for retrieving specific alert templates. That is, applying the provided rules, the server may retrieve the corresponding template. An alert template may define the format of the alert, and include certain pre-set contents and certain changeable contents. The rules for retrieving one or more templates may include "operation successful" or "operation failed."

In step 402, the server for sending and receiving alerts may receive a trigger for an alert from the service provider. A trigger may include the identification of the alert receiver, the rule for retrieving an alert template, and the changeable contents for the alert template. In certain embodiments, the relationship between the service provider and the user may change. For example, a user may be promoted to a higher level of membership. Based on the rules set by the service provider, the relationship or status change may trigger different contents to be generated for the alerts sent to the user.

In step 403, the server for sending and receiving alerts may send the alert to the alert receiver (user) as a reminder. In some embodiments, the server may obtain the alert receiver (i.e., the alert receiver or user) information from the trigger and then send the composed alert to the alert receiver (i.e., the alert receiver or user). The alert may be composed based on the alert template and the changeable contents received in the trigger.

A service provider may send a request for alerts providing rules that are not compatible with the alert templates. For example, a service provider may mistakenly link a rule such as "Order Complete" or an alert template with the message of "XXX order failed." The system for sending and receiving alerts cannot properly alert an alert receiver using such an alert template. To avoid this type of problems, the system may verify the request from a service provider before accepting the request. Based on verification rules, the system for sending and receiving alerts may verify each alert request submitted by a service provider. If the request is verified, then the system may further process the alert request.

In some embodiments, to ensure that the alert templates provided by the service providers can properly alert the alert receiver (i.e., the alert receiver or user), the server for sending and receiving alerts may test the alert request submitted by a service provider before it accepts any trigger sent by the service provider. If the alert request passes the test, the server may then accept the trigger from the service provider. Many different tests can be set up to test the alert requests. The service provider may test the alerts using the server for sending and receiving alerts. If the test is successful, then the server may determine that the request alert is valid and can be used to send alerts to alert receivers (i.e., the alert receiver or user). Otherwise, the server may further adjust/debug the request for alerts until it can generate a correct alert.

In some embodiments, the service provider may obtain data related to alerts sent to the alert receivers (i.e., the alert receivers or users). The service provider may analyze the data to improve the effectiveness of its alerts and determined whether to send more alerts to the alert receivers (i.e., the alert receivers or users). The server for sending and receiving alerts may execute the following steps to provide data to service providers. The server may store a log for operations related to sending and receiving alerts. The server may provide the log to the service provider for further analysis.

Embodiments consistent with the present disclosure improve upon sending alerts through Short Messaging Services. The system may send alerts to the alert receivers (i.e., the alert receivers or users) through instant messaging services and improve the user experience of the alert receivers (i.e., the alert receivers or users). In addition, the service provider does not need to obtain the alert receivers' (users)

telephone numbers when implementing a system for sending and receiving alerts consistent with the present disclosure. Embodiments consistent with the present disclosure thus may improve the efficiency of the alert process.

Figure 5:
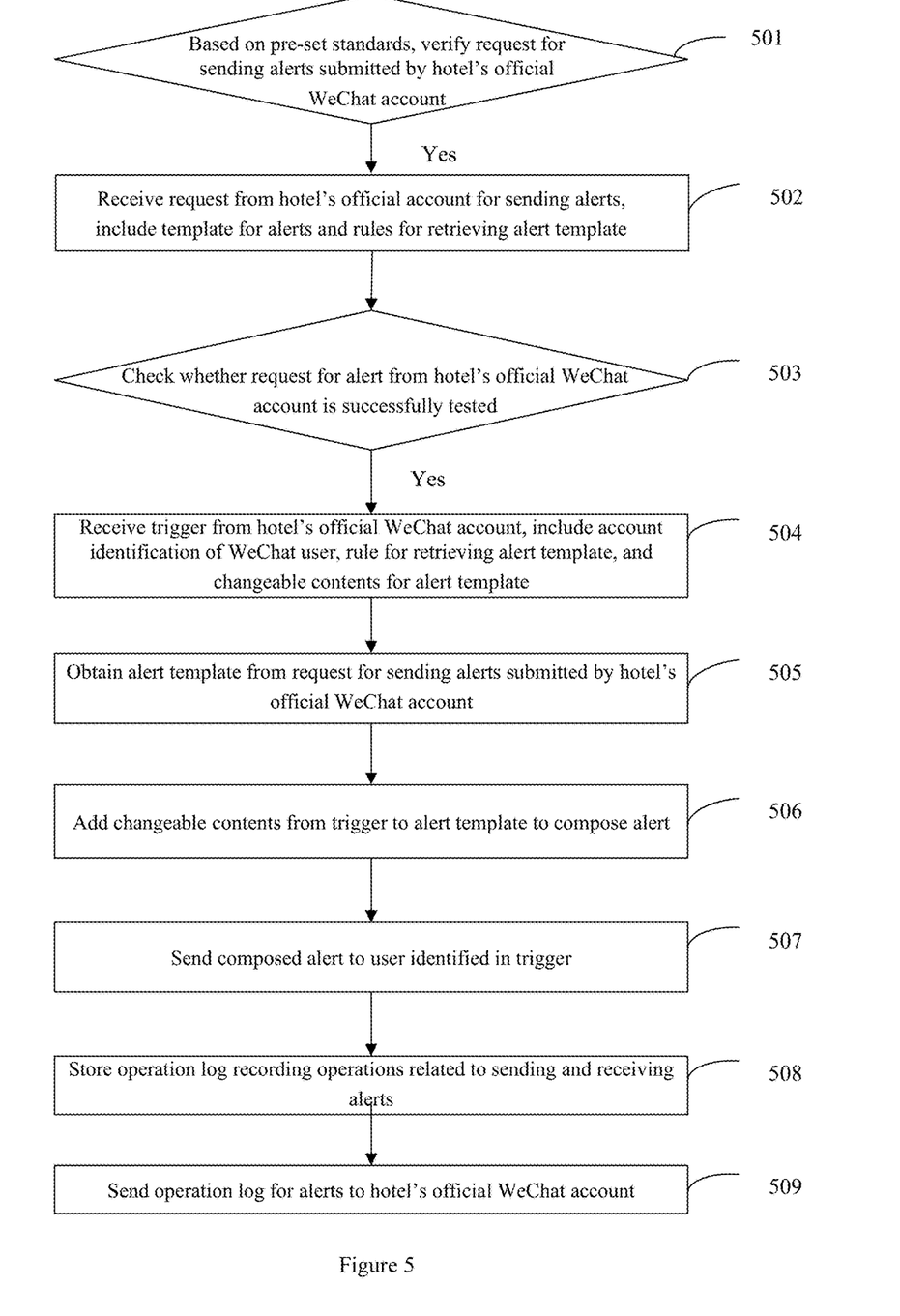
FIG. 5 is another flowchart of a method for sending and receiving alerts related to making hotel reservations implemented by an exemplary embodiment consistent with the present disclosure.

In addition to the above examples, embodiments consistent with the present disclosure may be implemented in instant messaging applications such as Tencent's WeChat. Embodiments consistent with the present disclosure may provide alerts to WeChat users for their hotel reservations, online electronics purchases, etc. FIG. 5 provides a flow chart of a method for sending and receiving alerts in WeChat implemented by embodiments consistent with the present disclosure. In the example shown in FIG. 5, the service provider may be a hotel's official WeChat account. The alert receivers may be any WeChat user that has established itself as a customer with the hotel's official WeChat account. For example, the hotel's official WeChat account may have a WeChat group set up for its customers and add a user to its customer group as needed. Alternatively, a WeChat user may scan a code, such as a barcode into a WeChat interface. The hotel's official WeChat account may also establish a link with the user with a verified barcode. The method in FIG. 5 includes steps 501-509.

In step 501, based on pre-set standards, the system for sending and receiving alerts may verify a request for sending alerts submitted by a hotel's official WeChat account. If the request is verified, then the system moves to execute step 502. In this embodiment, the system may test the alerts using a server for sending and receiving alerts. If the test is successful, then the server may determine that the request alert is valid and can be used to send alerts to users. Otherwise, the system for sending and receiving alerts may further adjust/debug the request for alerts until it can generate a correct alert.

In step 502, a system for sending and receiving alerts may receive a request from the hotel's official account for sending alerts. The hotel's request may include the templates for alerts and the rules for retrieving a specific alert template. For example, an alert template may have a data field "XXX, Your XXX reservation is confirmed." A rule for retrieving this specific alert template may be "Hotel reservation confirmed."

In step 503, the system for sending and receiving alerts may check whether the request for alerts from the hotel's official WeChat account is successfully tested. If so, the system will execute step 504. In this embodiment, before the system starts to send alerts requested by the hotel's official WeChat account, it may first test the requests from the hotel's official WeChat account. The system may set up a few test accounts. Based on the user experience of the test account users, the system for sending and receiving alerts may then determine whether a request for alerts submitted by the hotel is valid. If the test process produced a proper alert to the test account, then the system may determine that the request for alerts is valid and can be used to send alerts to users. If the test process produced an incorrect alert to the test account, the system may further adjust/debug the request for alerts until it can generate a correct alert. When the system completes the testing process, it may then execute step 504.

In step 504, the system for sending and receiving alerts may receive one or more triggers from the hotel's official WeChat account. Each trigger may include an identification of a WeChat user, one or more rules for retrieving an alert template, and changeable contents for the alert template. For example, a user may be promoted to a higher level of membership. Based on the rules set by the hotel's official WeChat account, the relationship or status change may trigger different contents to be generated for the alerts. In another example, if a WeChat user successfully made a reservation with the hotel through a WeChat interface, then the hotel's official WeChat account may send a trigger to the system for sending and receiving alerts. The trigger may include the account identification of the WeChat user, one or more rules for retrieving an alert template, and changeable contents for the alert template.

In step 505, the system for sending and receiving alerts may obtain an alert template from the request for sending alerts submitted by the hotels' official WeChat account. In this example, after analyzing the request received from the hotel's official WeChat account, the system may retrieve the alert template corresponding to the one or more rules in the received trigger. For example, the rule may be "reservation complete," which may correspond to an alert template with the text of "XXX, Your reservation for XXX at the Star Hotel is confirmed."

In step 506, the system for sending and receiving alerts may add the changeable contents from the trigger to the alert template to compose the alert. For example, the trigger may include changeable contents "Mr. Wang" and "Room 301." The system for sending and receiving alerts may then insert the changeable contents into the alert with the text "XXX, Your reservation for XXX at the Star Hotel is confirmed." The composed alert is therefore, "Mr. Wang, Your reservation for Room 301 at the Star Hotel is confirmed."

In step 507, the system for sending and receiving alerts may send the composed alert to the user identified in the trigger. For example, the system may send the alert to the hotel guest identified in the trigger sent by the hotel's official WeChat account.

In step 508, the system for sending and receiving alerts may store an operation log recording the operations related to sending and receiving alerts. In step 509, the system may send the operation log for the hotel's alerts to the hotel's official WeChat account. For example, the log may include all reservations made by guests at that hotel during a period. The hotel may analyze the data in the log and determine whether the alerts were effective.

Embodiments consistent with the present disclosure provide method for hotels to send alerts to its guests. The system may send alerts to hotel guests' WeChat accounts through instant messaging services and provide seamless user experience. In addition, the hotel does not need to obtain a guest's (users) telephone numbers when implementing a system for sending and receiving alerts consistent with the present disclosure. Embodiments consistent with the present disclosure thus may improve the efficiency of the alert process. Further, a WeChat user may make reservations and receive confirmations (alerts) through WeChat, which provides a seamless user experience.

Figure 6:
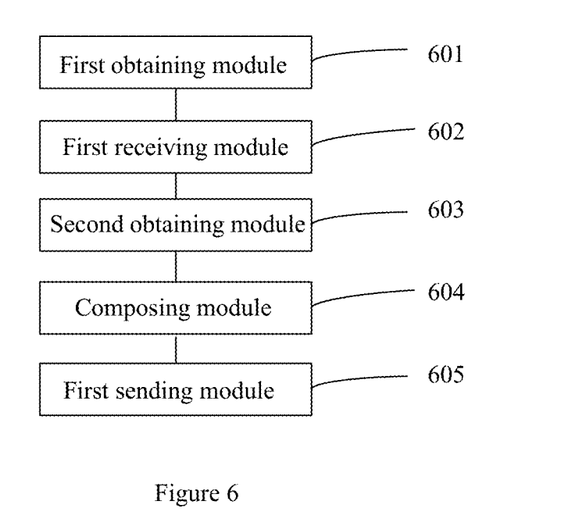
FIG. 6 is an exemplary system for sending and receiving alerts consistent with the present disclosure.

FIG. 6 shows an exemplary system for sending and receiving alerts consistent with the present disclosure. As shown in FIG. 6, the exemplary system may include a first obtaining module 601, a first receiving module 602, a second obtaining module 603, a composing module 604, and a first sending module 605. The first obtaining module 601 may obtain a request for sending alerts from a service provider. The request may include an alert template and one or more rules for retrieving the template. The first receiving module 602 may receive a trigger from a service provider. The trigger may include an identification of the alert receiver, a rule for retrieving an alert template, and changeable contents for the alert template. The second obtaining module 603 may obtain an alert template based on the rule sent in the trigger. The composing module 604 may compose the alert using the changeable contents and the alert template. The first sending module 605 may send the composed alert to the alert receiver identified in the trigger received by the first receiving module 602.

In addition, to ensure that the alert serves its purpose, the system for sending and receiving alerts may further include a verification module, which may be used to set standards to verify the request for sending alerts submitted by the service provider. If the request meets the standards, then the system may further obtain the request from the service provider. The verification rules may be rules reflecting business requirements (e.g., if a transaction is successful, it should not trigger an alert stating the transaction failed). Further, to ensure that the requests for sending alerts can be used properly, the system may include a test module, which may test the request for sending alerts submitted by the service provider. If the request passes the test, the system may further receive triggers from the service provider. Furthermore, to provide statistics related to the alerts, the system may include a storing module and a second sending module. The storing module may be used to store logs with data related to sending and receiving alerts. The second sending module may send the log to the service provider.

Embodiments consistent with the present disclosure may first receive a request for alerts from a service provider. Then the system may receive a trigger to send the alert from the service provider. The system may obtain the identification of the alert receiver (i.e., the alert receiver or user), a rule for retrieving the alert template, and changeable contents for the alert template. The system may then identify the alert template corresponding to the rule in the trigger. The alert template is received as a part of the request for alerts. The system may further compose the alert based on the alert template and the changeable contents provided by the service provider. The system may then send the alert to the alert receiver (i.e., the alert receiver or user) as a reminder. Embodiments consistent with the present disclosure do not send alerts through Short Messaging Services. The system may send alerts to the alert receivers (i.e., the alert receivers or users) through instant messaging services and improve the user experience. In addition, the service provider does not need to obtain the alert receivers' (i.e., the alert receiver or user) telephone numbers when implementing a system for sending and receiving alerts consistent with the present disclosure. Embodiments consistent with the present disclosure thus may improve the efficiency of the alert process.

Figure 7:
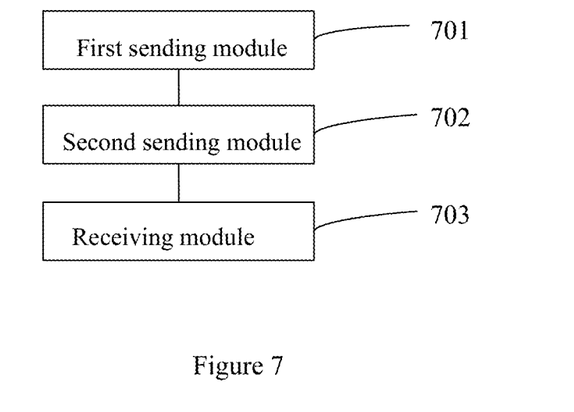
FIG. 7 is another exemplary system for sending and receiving alerts consistent with the present disclosure.

FIG. 7 shows an exemplary system for sending and receiving alerts consistent with the present disclosure. As shown in FIG. 7, the system for sending and receiving alerts may include a first sending module 701, a second sending module 702, and a receiving module 703. The first sending module 701 may be used to send a request for sending alerts from a service provider to a server for sending and receiving alerts. The request may include an alert template and one or more rules for retrieving the template. The second sending module 702 may send a trigger from a service provider to the server for sending and receiving alerts. The trigger may include an identification of the alert receiver (i.e., the alert receiver or user), a rule for retrieving an alert template, and changeable contents for the alert template. The receiving module 703 may receive the alert from the server for sending and receiving alerts. The alert may be composed based on the alert template and the changeable contents provided by the service provider.

Embodiments consistent with the present disclosure do not send alerts through Short Messaging Services. The system may send alerts to the alert receivers (i.e., the alert receivers or users) through instant messaging services and improve the user experience of the alert receivers (i.e., the alert receiver or user). In addition, the service provider does not need to obtain the alert receivers' (i.e., the alert receiver or user) telephone numbers when implementing a system for sending and receiving alerts consistent with the present disclosure. Embodiments consistent with the present disclosure thus may improve the efficiency of the alert process.

Consistent with embodiments of the present disclosure, one or more non-transitory storage medium storing a computer program are provided to implement the system and method for sending and receiving alerts. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various systems for sending and receiving alerts may be implemented. For example, users in an instant messaging session may sign up to receive various alerts such as traffic or weather alerts from service providers. Users using the instant messaging applications may also set up reminders for their groups of friends for event planning purposes. For example, one user may send out invitations to a group of his friends for an event. Depending on the responses to his invitations, the user may then set up an attendees' group and send updates to the attendees. The user may also send reminders to the attendees' group as the event date approaches.

In another example, a service provider may send different alerts based on multiple rules for retrieving alert templates. For example, a hotel may have different levels of guest memberships, such as silver, gold, and platinum members. If a reservation is confirmed for a gold member, the hotel may send an alert with benefits specific to gold members. If a reservation is confirmed for a platinum member, the hotel may send an alert with benefits specific to gold members. In this example, the rules for retrieving an alert template may be "reservation confirmed" AND "gold member" or "reservation confirmed" AND "platinum member." The rules may be set up with any kind of logic specified by the hotel or the instant messaging service provider.

By enabling making business transactions and receiving confirmation (alerts) seamlessly in an instant messaging interface, the system for sending and receiving alerts provides users with an enriched user experience.

What is claimed is:

1. A method for sending and receiving alerts in an instant messaging environment, comprising:

receiving, by a server of an instant messaging service, a request for alerts from a service provider, the request including an alert template and a rule to retrieve the alert template, the service provider having a service account registered with the instant messaging service;

receiving, by the server of the instant messaging service, a trigger from the service provider, the trigger including an identification of an alert receiver, the rule to retrieve the alert template, and changeable contents for the alert template, wherein the alert receiver is a user account registered with the instant messaging service, the user account is logged into an instant messaging application corresponding to the instant messaging service on a user terminal; and the service provider automatically sends the trigger in response to a prior communication between the user account and the service account through the instant messaging application;

obtaining, by the server of the instant messaging service, the alert template from the request for alerts based on the rule to retrieve the alert template in the trigger;

composing, by the server of the instant messaging service, an alert using the alert template and the changeable contents; and sending, by the server of the instant messaging service, the alert to the alert receiver identified in the trigger, wherein the alert is displayed in an instant messaging interface on the user terminal as an incoming instant message from the service account, wherein receiving the request for alerts from the service provider further comprises: providing, by the server, a graphical user interface for the service provider to configure the alert template and the rule to retrieve the template; and wherein the method further comprises, after receiving the request for alerts including the alert template and the rule to retrieve the template, establishing, by the server, a test account, the test account being a user account of the instant messaging service;

receiving, by the server, a test trigger from the service provider, the test trigger including an identification of the test account, the rule to retrieve the alert template, and changeable contents for the alert template;

obtaining, by the server, the alert template from the request for alerts based on the rule to retrieve the alert template in the test trigger;

composing, by the server, a test alert using the alert template and the changeable contents;

sending, by the server, the test alert to the test account identified in the test trigger; and determining that the request for alerts is valid and can be used to send alerts to users if the test alert sent to the test account is proper.

2. The method according to claim 1, further comprising: verifying the request for alerts based on pre-set standards.

3. The method according to claim 1, further comprising: storing an operation log containing data related to sending and receiving alerts requested by the service provider; and sending the operation log to the service provider.

4. The method according to claim 1, wherein:

the request for alerts comprises multiple alert templates and multiple rules for retrieving alert templates; and each of the multiple rules for retrieving alert templates are based on a relationship change or a status change between the user account and the service provider according to the prior communication between the user account and the service provider through the instant messaging application.

5. The method according to claim 4, wherein each alert template corresponds to one or more rules for retrieving alert templates.

6. The method according to claim 1, further comprising:

obtaining the first parameters from the template composition section, wherein the first parameters includes at least two second parameters of a same type, and the at least two second parameters are presented by same characters in the template composition section; and numbering the second parameters of the same type, wherein characters representing the second parameters in the preview section are numbered respectively.

7. The method according to claim 6, further comprising:

providing, on the graphical user interface for configuring the alert template, a parameter section showing multiple types of parameters available to be entered for the alert template.

8. The method according to claim 1, further comprising:

before receiving the trigger from the service provider, adjusting the request for alerts until a correct test alert is generated.

9. A system for sending and receiving alerts in an instant messaging environment, comprising at least a processor of a server of an instant messaging service and a plurality of program modules to be executed by the processor, the plurality of program modules comprising:

a first obtaining module configured to obtain a request for alerts from a service provider, the request including an alert template and a rule to retrieve the alert template, the service provider having a service account registered with the instant messaging service;

a first receiving module configured to receive a trigger from the service provider, the trigger including an identification of an alert receiver, the rule to retrieve the alert template, and changeable contents for the alert template, wherein the alert receiver is a user account registered with the instant messaging service, the user account is logged into an instant messaging application corresponding to the instant messaging service on a user terminal; and the service provider automatically sends the trigger in response to a prior communication between the user account and the service account through the instant messaging application;

a second obtaining module configured to obtain the alert template from the request for alerts based on the rule to retrieve the alert template in the trigger;

a composing module configured to compose an alert using the alert template and the changeable contents; and a sending module configured to send the alert to the alert receiver identified in the trigger, wherein the alert is displayed in an instant messaging interface on the user terminal as an incoming instant message from the service account, wherein the first obtaining module is further configured to: provide a graphical user interface for the service provider to configure the alert template and the rule to retrieve the template; and wherein the plurality of program modules of the system further comprises a testing module configured to:

after receiving the request for alerts including the alert template and the rule to retrieve the template, establish a testing account, the test account being a user account of the instant messaging service;

receive a test trigger from the service provider, the test trigger including an identification of the test account, the rule to retrieve the alert template, and changeable contents for the alert template;

obtain the alert template from the request for alerts based on the rule to retrieve the alert template in the test trigger;

compose a test alert using the alert template and the changeable contents;

send the test alert to the test account identified in the test trigger; and determine that the request for alerts is valid and can be used to send alerts to users if the test alert sent to the test account is proper.

10. The system according to claim 9, the plurality of program modules of the system further comprising:

a verifying module configured to verify the request for alerts based on pre-set standards.

11. The system according to claim 9, the plurality of program modules of the system further comprising:

a storing module configured to store an operation log containing data related to sending and receiving alerts requested by the service provider; and wherein the sending module is further configured to send the operation log to the service provider.

12. The system according to claim 9, wherein:

the request for alerts includes multiple alert templates and multiple rules for retrieving alert templates; and each of the multiple rules for retrieving alert templates are based on a relationship change or a status change between the user account and the service provider according to the prior communication between the user account and the service provider through the instant messaging application.

13. The system according to claim 12, wherein each alert template corresponds to one or more rules for retrieving alert templates.

14. The system according to claim 13, wherein the second obtaining module is further configured to obtain the alert template based on the one or more rules for retrieving alert templates received from the trigger.

15. The method according to claim 4, wherein the relationship change or the status change between the user account and the service provider includes: a membership level change of the user account at the service provider, and an update of an event that the user account signed up with the service provider.

16. A non-transitory computer-readable medium containing computer-executable program for, when being executed by a processor, implementing a method for sending and receiving alerts in an instant messaging environment, the method comprising:

receiving, by a server of an instant messaging service, a request for alerts from a service provider, the request including an alert template and a rule to retrieve the alert template, the service provider having a service account registered with the instant messaging service;

receiving, by the server of the instant messaging service, a trigger from the service provider, the trigger including an identification of an alert receiver, the rule to retrieve the alert template, and changeable contents for the alert template, wherein the alert receiver is a user account registered with the instant messaging service, the user account is logged into an instant messaging application corresponding to the instant messaging service on a user terminal; and the service provider automatically sends the trigger in response to a prior communication between the user account and the service account through the instant messaging application;

obtaining, by the server of the instant messaging service, the alert template from the request for alerts based on the rule to retrieve the alert template in the trigger;

composing, by the server of the instant messaging service, an alert using the alert template and the changeable contents; and sending, by the server of the instant messaging service, the alert to the alert receiver identified in the trigger, wherein the alert is displayed in an instant messaging interface on the user terminal as an incoming instant message from the service account, wherein receiving the request for alerts from the service provider further comprises: providing, by the server, a graphical user interface for the service provider to configure the alert template and the rule to retrieve the template; and wherein the method further comprises, after receiving the request for alerts including the alert template and the rule to retrieve the template, establishing, by the server, a test account, the test account being a user account of the instant messaging service;

receiving, by the server, a test trigger from the service provider, the test trigger including an identification of the test account, the rule to retrieve the alert template, and changeable contents for the alert template;

obtaining, by the server, the alert template from the request for alerts based on the rule to retrieve the alert template in the test trigger;

composing a test alert using the alert template and the changeable contents;

sending, by the server, the test alert to the test account identified in the test trigger; and determining that the request for alerts is valid and can be used to send alerts to users if the test alert sent to the test account is proper.

17. The medium according to claim 16, wherein the method further comprises:

verifying the request for alerts based on pre-set standards.

18. The medium according to claim 16, wherein the method further comprises:

storing an operation log containing data related to sending and receiving alerts requested by the service provider; and sending the operation log to the service provider.

19. The medium according to claim 16, wherein:

the request for alerts comprises multiple alert templates and multiple rules for retrieving alert templates; and each of the multiple rules for retrieving alert templates are based on a relationship change or a status change between the user account and the service provider according to the prior communication between the user account and the service provider through the instant messaging application.

20. The medium according to claim 19, wherein: each alert template corresponds to one or more rules for retrieving alert templates.

* * * * *